US007173711B2

(12) United States Patent
Dholakia et al.

(10) Patent No.: US 7,173,711 B2
(45) Date of Patent: Feb. 6, 2007

(54) APPARATUS FOR OPTICALLY ROTATING MICROSCOPIC OBJECTS

(75) Inventors: Kishan Dholakia, St. Andrews (GB); Michael Peter Macdonald, Fife (GB); Jochen Arlt, Edinburgh (GB)

(73) Assignee: University Court of the University of St. Andrews, Fife (GB)

( * ) Notice: Subject to any disclaimer, the term of this patent is extended or adjusted under 35 U.S.C. 154(b) by 285 days.

(21) Appl. No.: 10/451,576

(22) PCT Filed: Dec. 18, 2001

(86) PCT No.: PCT/GB01/05631

§ 371 (c)(1),
(2), (4) Date: Dec. 8, 2003

(87) PCT Pub. No.: WO02/51216

PCT Pub. Date: Jun. 27, 2002

(65) Prior Publication Data

US 2004/0090632 A1 May 13, 2004

(30) Foreign Application Priority Data

Dec. 21, 2000 (GB) ................................ 0031249.6
Aug. 31, 2001 (GB) ................................ 0121144.0

(51) Int. Cl.
*G01B 9/02* (2006.01)

(52) U.S. Cl. ..................................................... 356/450

(58) Field of Classification Search ................ 356/450, 356/457, 491; 250/251
See application file for complete search history.

(56) References Cited

OTHER PUBLICATIONS

Trapping and manipulation of low-index particles in a two-dimensional interferometric optical trap, MacDonald et al, Optics Letters, Jun. 2001, pp. 863-865.*
The angular momentum of light: optical spanners and the rotational frequency shift, Padgett et al, Optical and Quantum Electronics, 1999, 1-12.*
O'Neil, A. T. and Padgett, M. J., "Three dimensional optical confinement of micro-sized metal particles and the decoupling of the spin and orbital angular momentum within an optical spanner," Optics Communications, 185, pp. 139-143 (2000).*
Simpson, N. B., Allen, L., and Padgett, M. J., "Optical Tweezers and optical spanners with Laguerre-Gaussian modes," Journal of Modern Optics, vol. 43, No. 12, 2485-2491 (1996).*
* cited by examiner

*Primary Examiner*—Gregory J. Toatley, Jr.
*Assistant Examiner*—Marissa J. Detschel
(74) *Attorney, Agent, or Firm*—Barnes & Thornburg LLP

(57) ABSTRACT

Apparatus for and a method of rotating microscopic objects uses a beam of electromagnetic radiation. A microscopic, non-circularly symmetric distribution of electro-magnetic radiation is projected on to a region containing an object to be rotated so as to cause photons in the beam to refract around the objects. Rotating means then rotate that distribution and so rotate the objects. The distribution may be formed on the interference pattern between a beam having a Laguerre-Gaussian wave fronts and either a plane wave or a further Laguerre-Gaussian beam of opposite helicity.

21 Claims, 12 Drawing Sheets

$l_1 = 1$; $l_2 = -1$ $z = 0$ $z = z_R$ $l = 1$
and
$l = -1$ $l = 2$
and
$l = -2$

APPARATUS FOR OPTICALLY ROTATING MICROSCOPIC OBJECTS

FIELD OF THE INVENTION

This invention relates to apparatus for rotating microscopic objects, and particularly to apparatus which uses a beam of electromagnetic radiation to that end. The invention also relates to a method of rotating a microscopic object using electromagnetic radiation.

BACKGROUND TO THE INVENTION

The use of optical forces to trap and manipulate micron size particles was pioneered by A. Ashkin over ten years ago. [See A. Ashkin, J. M. Dziedzic, J. E. Bjorkholm and S. Chu, Opt. Lett., 11,288 (1986)]. He showed that a single, tightly focused laser beam could be used to hold a microscopic particle in three dimensions near the focus of the beam. Apparatus using a beam in this way provides a powerful non-invasive technique for manipulating microscopic particles, and is generally known as "optical tweezers".

Optical tweezers have firmly established themselves as powerful tools, especially in the field of biology where they have enabled a range of studies to be conducted. This includes work on DNA, colloids, red blood cells, chromosomes and other biological specimens.

Optical tweezers make use of the optical gradient force: for particles of higher refractive index than their surrounding medium, photons from the beam are refracted around the particles and thus impart reaction forces (resulting from their change in momentum) on the particles. The more photons that are refracted in one general direction, the greater the reaction force on the particle in the opposite direction. This results in various particles migrating towards and being held within the region of the beam with the highest light intensity.

However, conventional optical tweezers provide little or no effective control over the orientation of the microscopic particles which they manipulate.

The ability to induce controlled rotation of trapped particles within optical tweezers potentially offers a new degree of control for microscopic objects and has significant applications in optical micro machines and biotechnology. To date, two major schemes have successfully enabled trapped micro objects to be set into rotation. The first scheme employs Laguerre-Gaussian light beams [H. He, M. E. J. Friese, N. R. Heckenberg, H Rubinsztein-Dunlop, Phys. Rev. Lett., 75 826, (1995); M. E. J. Friese, Enger J, H. Rubinsztein-Dunlop, N. R. Heckenberg, Phys. Rev. A54, 1593–1596 (1996); N. B. Simpson, K. Dholakia, L. Allen and M. J. Padgett, Opt. Lett., 22, 52 (1997)]. Such beams possess an on-axis phase singularity characterised by helical wavefronts. Thus, the Poynting vector in such beams follows a corkscrew-like path as the beams propagate, and this gives rise as to what is termed as orbital angular momentum in the light beam [L. Allen, M. W. Beijersbergen, R. J. C. Spreeuw, J. P. Woerdman, Phys. Rev. A45, 8185 (1992)].

This angular momentum is distinct from any angular momentum due to the polarisation state of the light and has magnitude of lh where l is one of two indices that describes the mode. Specifically l refers to number of complete cycles of phase ($2\pi l$) upon going around the mode circumference. However, to transfer orbital angular momentum to a trapped particle with such a beam, the particle must typically absorb some of the laser light yet still be transparent enough to be tweezed. This in turn restricts the range of particles this method can be applied to and also further limits this technique in that heating from this absorption could damage the rotating particle. Furthermore, as the particle absorption can be difficult to quantify, controlled rotation of trapped objects in such a beam is very difficult to realise.

The other technique for rotation makes use of the change in polarisation state of light upon passage through a birefringent particle [M. E. J. Friese, T. A. Nieminen, N. R. Heckenberg, H. Rubinsztein-Dunlop, Nature, 394,348 (1998)]. For example, circularly polarised light is well known to possess spin angular momentum and this angular momentum can be exchanged with a birefringent medium (e.g. calcite) upon passage of the beam through the medium.

This method has achieved rotation rates of a few hundred hertz for irregular samples of crushed calcite, but it limited solely to birefringent media, is difficult to control and is thus not widely applicable. Thus both these methods have serious shortcoming for rotating optical microcomponents.

SUMMARY OF THE INVENTION

According to a first aspect of the invention, there is provided apparatus for rotating microscopic objects, the apparatus comprising beam projection means for projecting a microscopic, non-circularly symmetric distribution of electromagnetic radiation onto a region containing such an object so as to cause photons in the beam to refract around the object, rotating means for rotating the distribution relative to an object in such a region, wherein, in use, said rotation causes optical gradient forces to be exerted on the object, in such a way as to rotate the object.

For the purposes of this specification, a distribution of light is non-circularly symmetric if its outline is non-circularly symmetric and/or if the intensity distribution of light in the distribution is non-circularly symmetric. A distribution of electromagnetic-radiation may comprise a non circularly symmetric patch or a plurality of patches each of which is, individually, circularly symmetric but which define a non-circularly symmetric distribution.

Thus, the apparatus uses the optical gradient force to impart controlled rotation to microscopic objects. This force is not dependent on a microscopic object being able to absorb the incident electromagnetic radiation, nor on any optically anisotropic qualities of the object. Thus, the apparatus can be used to impart a controlled rotation (corresponding to the degree of rotation of the distribution) on an object which does not absorb the incident electromagnetic, and which is not birefringent.

In a preferred embodiment the rotation means and beam projection means are incorporated into an interferometer, preferably having beam splitting means which are adapted to cause an input beam of laser electromagnetic radiation to be split into two components travelling along different paths, one of the components may be substantially a planar wave, the other having helical wave fronts, the interferometer further comprising combining means for re-combining the two components to create an interference pattern which constitutes that distribution of electromagnetic radiation, the rotation means comprising path varying means for varying the effective path length of one of the components from the splitting means to the combining means.

Since the distribution is constituted by the interference pattern between a beam of light having helical wave fronts and one having plane wave fronts, the alteration of the relative phase between the two components (with adjustment means) will cause the interference pattern to rotate about the axis of the re-combined beam.

More preferably, the beam splitting means is adapted so that both components have helical wave fronts, the components having opposite helicity, the interferometer further comprising combining means for recombining the two components to create an interference pattern which constitutes that distribution of electromagnetic radiation, the rotation means comprising path varying means for varying the effective path length of one of the components from the splitting means to the combining means.

Thereby the distribution comprises a plurality of spot shaped patches, these having a better definition in their pattern profile giving improved trapping of particles. A further advantage is that the resulting pattern of spots does not change appreciably either side of the focus position making it possible to trap the particles in 3-D, preferably the helical components are Laguerre-Gaussian. The two beams may have different azimuthal indices. An interferometer is particularly advantageous as it can produce a pattern of output light that can propagate over a long distance. In addition, the adjustment means can cause the distribution of light projected by the interferometer to be rotated, in effect, at its point of creation, and thus avoids the need to provide any further rotatable optical element downstream of the interferometer.

Preferably, the path varying means is operable to vary the effective path length of said other components (i.e. the component having helical wave fronts).

Preferably, the path varying means comprises adjustable transmission means for altering the wave length of said other component over at least part of its path to the combining means.

Preferably, the path varying means is operable to change the wave lengths, and hence the effective path lengths of the other component without substantially altering the distance travelled by the latter from the beam splitting means to the combining means.

To that end, the transmission means may comprise a transparent member and means for moving the member relative to the path of the other component of the beam to alter the distance travelled by the latter through the transparent member.

Assuming the member has a higher refractive index than the rest of the medium through which said other components of the beam travels, an increase in the length of the path of the other component through the member will correspondingly increase the phase lag between the first and second components at the combining means.

Preferably, the transparent member comprises a transparent plate which is rotatable about an axis in or near the path of said other component of the beam.

Alternatively, the transmission means may comprise an element having a heat sensitive refractive index, and control means for controlling the temperature of the element, and hence its refractive index.

Preferably also, the path varying means comprises a frequency shifting means for altering the frequency of one of said components. Preferably, the frequency shifting means comprises at least one and preferably two acousto-optic modulators.

The shift in frequency between the two beam components means that when they are recombined and interfere, the resulting pattern rotates with the frequency difference determining the rotation rate. Importantly, this avoids the limitation that a glass plate has a maximum angle through which the resulting rotation can be accomplished.

Preferably, the splitting means is such that the other component of the beam (i.e. the component with helical wave fronts) is a Laguerre-Gaussian beam.

Preferably, the splitting means comprises a holographic element.

Conveniently, the interferometer includes a source of laser light for providing said input beam.

The invention also lies in a method for rotating a microscopic object about a rotational axis spaced from any axis of a circular symmetry of the object, the method comprising steps of projecting a distribution of light onto the object, said distribution being non-circularly symmetric about said rotational axis, and rotating the distribution about the rotational axis, thereby to exert on the object an optical gradient force for rotating the latter. Preferably, the distribution comprises one or more patches.

Thus, the method can be used to provide controlled rotation of circularly symmetric (e.g. spherical) objects which are displaced from the axis of rotation or non-circularly symmetric objects which are intersected by the axis.

BRIEF DESCRIPTION OF THE DRAWINGS

The invention will now be described, by way of example only, with reference to the accompanying drawings in which.

DETAILED DESCRIPTION

Figure 1:
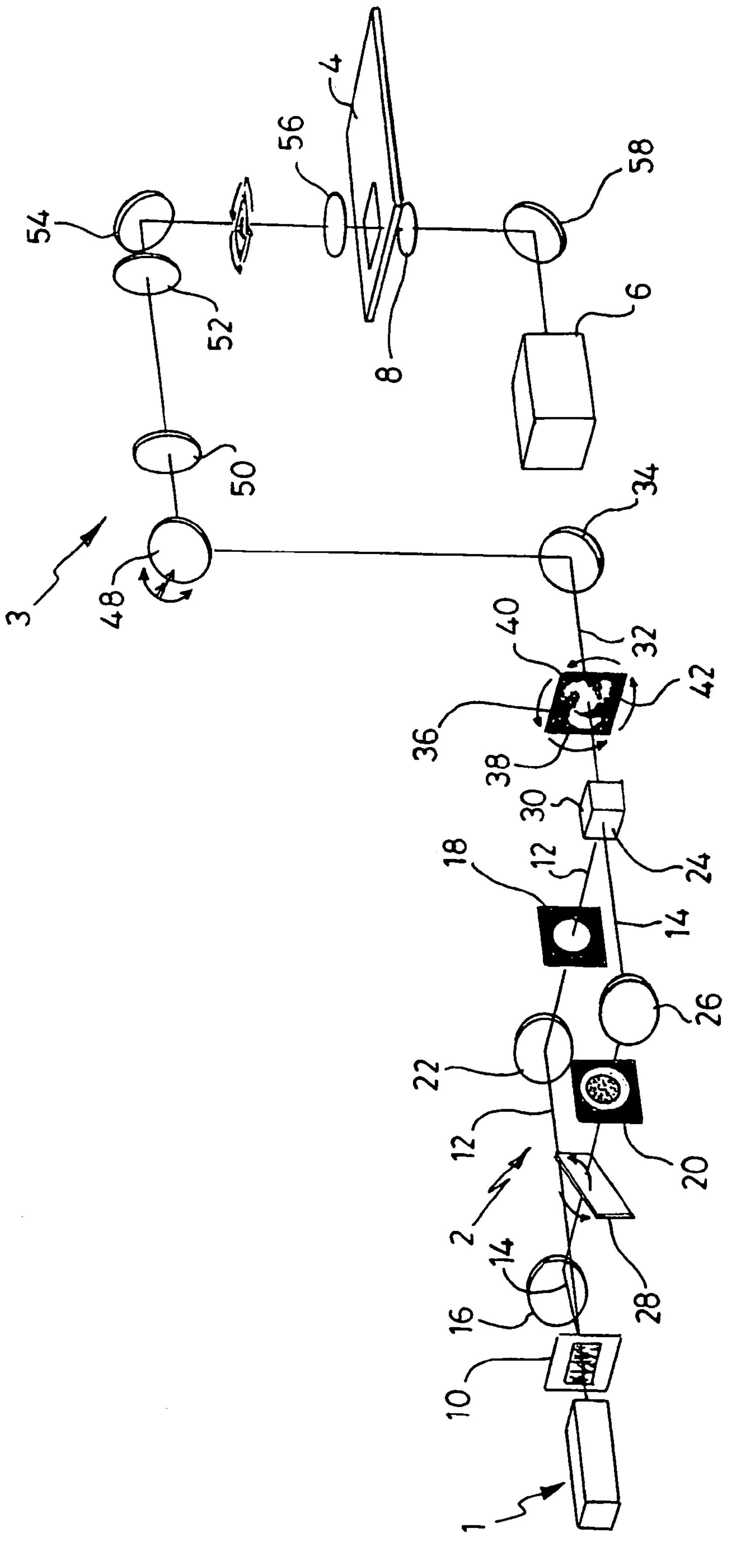
FIG. 1 is a schematic diagram of optical tweezer apparatus in accordance with a first embodiment of the invention.

With reference to FIG. 1, an Nd=glass laser 1 of power 1W at 1064 nm faces an interferometer 2, the output of which passes to an optical tweezer assembly 3. The assembly 3 includes a microscope stage and sample cell holder 4 in which the object to be rotated/manipulated is retained. A camera 6 is used to obtain an image, via a microscope objective 8, of the sample cell and hence the object therein.

The interferometer 2 comprises a beam splitter in the form of a hologram element 10 that splits the beam into two components. One of those components is a plane wave component 12 which passes straight through the hologram element 10 substantially undeflected, and which is in the form of a solid beam. The second component, referenced 14 is deflected to one side of the component 12 and onto a mirror 16 which is positioned clear of the path of the component 12, and which is so angled as to direct the component 14 in a direction perpendicular to that of the component 12. The hologram element 10 is so arranged that the second component 14 takes the form of a hollow beam (i.e. a cylinder of light) which is of a Laguerre-Gaussian form. In this particular case, the hologram element 10 is so arranged that the Laguerre-Gaussian beam is an LG l=3 beam. An LG l=2 beam is also generated this way. The appearance of the components 12 and 14, when viewed end-on, are illustrated at 18 and 20 respectively.

The component 12 is refracted by an angled mirror 22 along a path at right angles to the path from the laser 1 and into the combining means comprising a beam splitter 24.

A further mirror 26 reflects the component 14 along a path at right angles to the paths in the mirror 16 and also into the beam splitter 24. Path varying means in the form of a rotatable glass plate 28 is interposed in the path from the mirror 16 to the mirror 26.

The plate 28 is rotatable about a vertical axis which intersects the path taken by the component 14 between the mirrors 16 and 26, and is connected to a mechanism (not shown) for pivoting the plate 28 about that axis by controlled amounts. Such movements will vary the length of the path of the component 14 which lies within the plate 28. Thus, the maximum length of path through the plate 28 will occur when the latter is parallel with the path of the component 14 (i.e. at right angles to the path of the component 12 from the laser 1 to the mirror 22). The length of path taken by the component 14 through the plate 28 will be at a minimum when the plate is at right angles to the path of the component 14 and the mirror 16 to the mirror 26.

The plate 28 has a different refractive index from the rest of the medium through which the components 12 and 14 propagate to the splitter 24. As a result, the velocity of the component 14 (and hence its wave length) will be altered as the component 14 enters the plate 28. Thus, the plate 28 causes the phase of the component 14 to lag behind that of the component 12 by an amount which is related to the angular position of the glass plate (i.e. to the length of path over which the wave length of the component 14 is altered).

Figure 2:
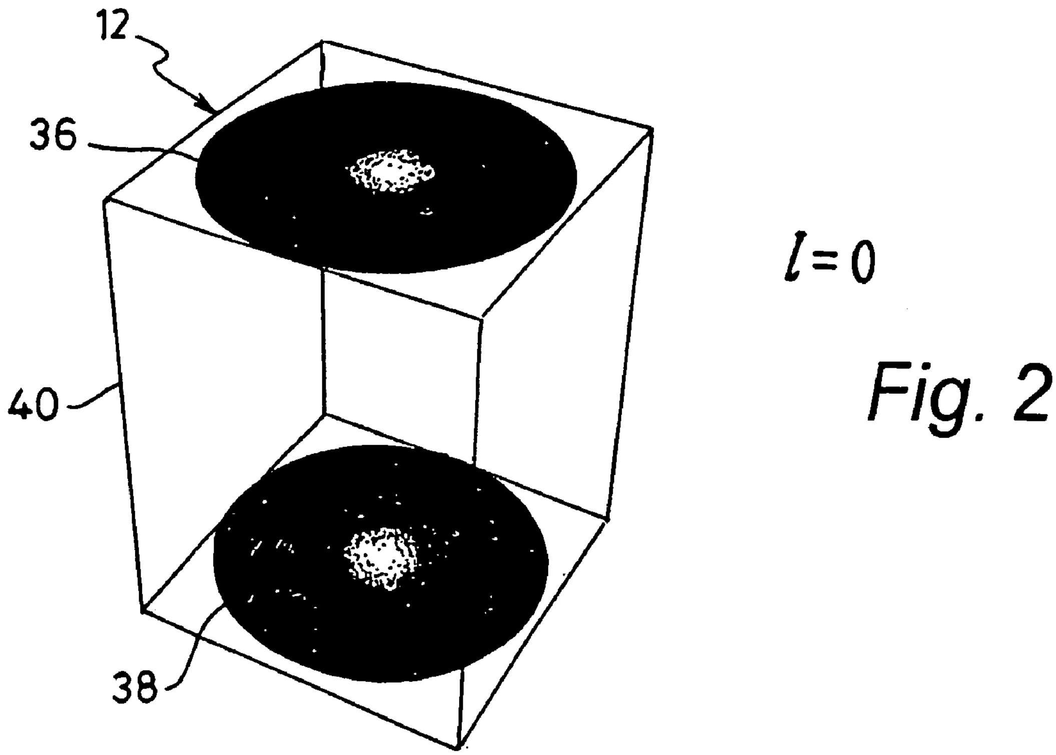
FIG. 2 is a diagrammatic representation of wave fronts of a plane wave of laser light.

The beam splitter 24 has a semi-reflective surface 30 which transmits the component 14 (reflected from the mirror 26) and reflects the component 12 (reflected from the mirror 22) along a single path 32 to an output mirror 34. The interference pattern produced by the combined beams is illustrated at 36 and comprises a spiral having three arms 38, 40 and 42. The way in which this interference pattern is formed can be best understood with reference to FIGS. 2 and 3. FIG. 2 shows two wave fronts of the plane wave component 12. These are illustrated as two circles 36 and 38 on the end faces of an enclosed volume 40 through which the component 12 travels (from the face with the disc 38 to the face with the disc 36).

Figure 3:
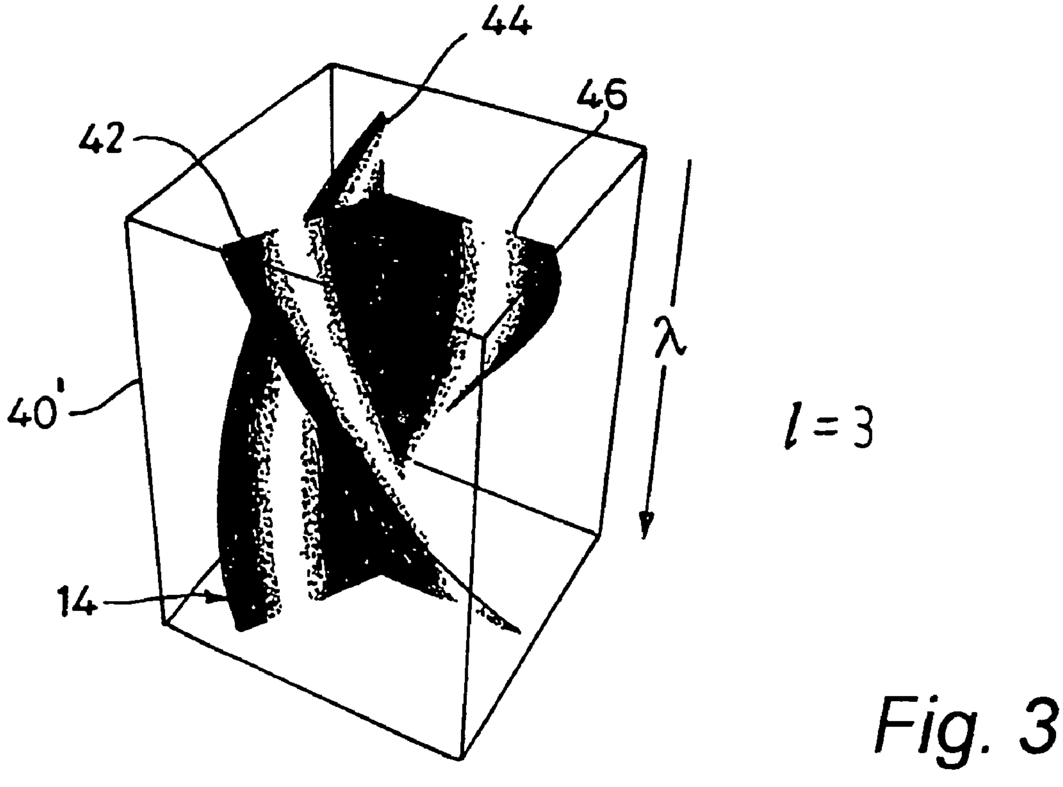
FIG. 3 is a similar diagram to FIG. 2, which shows the helical wave fronts of a Laguerre-Gaussian laser light beam (l=3)

With reference to FIG. 3, a Laguerre-Gaussian beam has two mode indices l and p, the index l denoting the number of complete cycles of phase upon going round the circumference of the mode. As an illustrative example, an l=2 or l=3 LG mode can be thought of as a double or triple start helix respectively. In the present case, the component 14 is in an l=3 LG mode, and the wave fronts therefore form a triple start helix having three helical arms, 44 and 46. These forms are shown in a volume 40' which corresponds to the volume 40. Thus, the component 14 travels from the bottom to the top of the volume 40, but as this happens the Poynting vector for the component 14 follows a helical path. Constructive interference of the two components occurs when the wave fronts are in phase with each other, i.e. on the intersection between the form as shown in FIG. 3 with a circle perpendicular to the axis of the helix. This gives the three-armed configuration illustrated at FIG. 3.

Moreover, by simply changing the path length of the interferometer (using the plate 28) it is possible to cause the spiral pattern to rotate in a controlled fashion about its axis. This is because the position of the plane wave front (e.g. 36) relative to the helical wave fronts (42, 44 and 46) will change. As an analogy, this is akin to considering what occurs along a length of thick cord that consists of l intertwined ropes. If the cord were successively cut along its length, and each time the individual ropes at the end of the cord viewed end-on, any given piece of rope in the cord would appear to rotate around the cord axis. Moving along the cord is analogous to altering the altering the optical path length in the interferometer, and changing the optical path length in the interferometer is akin to a change in the linear momentum of the light. The helical nature of the wave front of the LG component 14 transforms this into a linear momentum change about the axis of the interference pattern, that is angular momentum. It will be appreciated that the interferometer 2 could be readily modified by interposing the glass plate 28 in the path of the component 12 and the laser 1 to the beam splitter 24 so that rotation of the plate 28 alters the effective path length, and hence phase of the component 12. Indeed, the interferometer may be further modified by having two glass plates, one in the path of each respective component 12 and 14. This provides further control over the extent and sense of rotational movement of the spiral pattern 36. Light from the output of the interferometer 2 is passed to the optical tweezer assembly 3 in which a steering mirror 48 controls the direction of the output beam which passes through two lenses 50 and 52 onto a dielectric mirror 54 and then onto the sample cell via a ×40 microscope objective 56. The mirror 48 can be used to manoeuvre the beam so that it can catch a selected object or set of particles, and these particles can then be rotated by manipulating the glass plate 28 to cause the spiral interference pattern to rotate. Light from the cell is also transmitted through the objective 8 and onto a mirror 58 which reflects the light into a camera 6, the output of which is fed to a visual display unit (not shown) to enable the operation of the tweezers to be monitored.

Moreover, by simply changing the path length of the interferometer using the plate 28 we are able to cause the spiral pattern (and thus the trapped particles) to rotate in a controlled fashion about the axis of the spiral pattern. The rotation of the pattern occurs due to the helical nature of the wave fronts of a Laguerre-Gaussian light beam.

This technique relies on the optical gradient force to tweeze a trapped particle in the spiral arms and then utilises the variation (i.e. rotation) of this spiral pattern under a variation of optical path length to induce rotation. The technique can therefore be applied in principle to any object or objects that can be optically tweezed, in contrast to the conventional methods of rotation above. This technique can be extended to the use of LG beams of differing azimuthal index thus offering the prospect of trapping and rotating different shaped objects and groups of objects. The spiral pattern for tweezing too can readily be varied by use of different LG beams of different azimuthal index.

Figure 5:
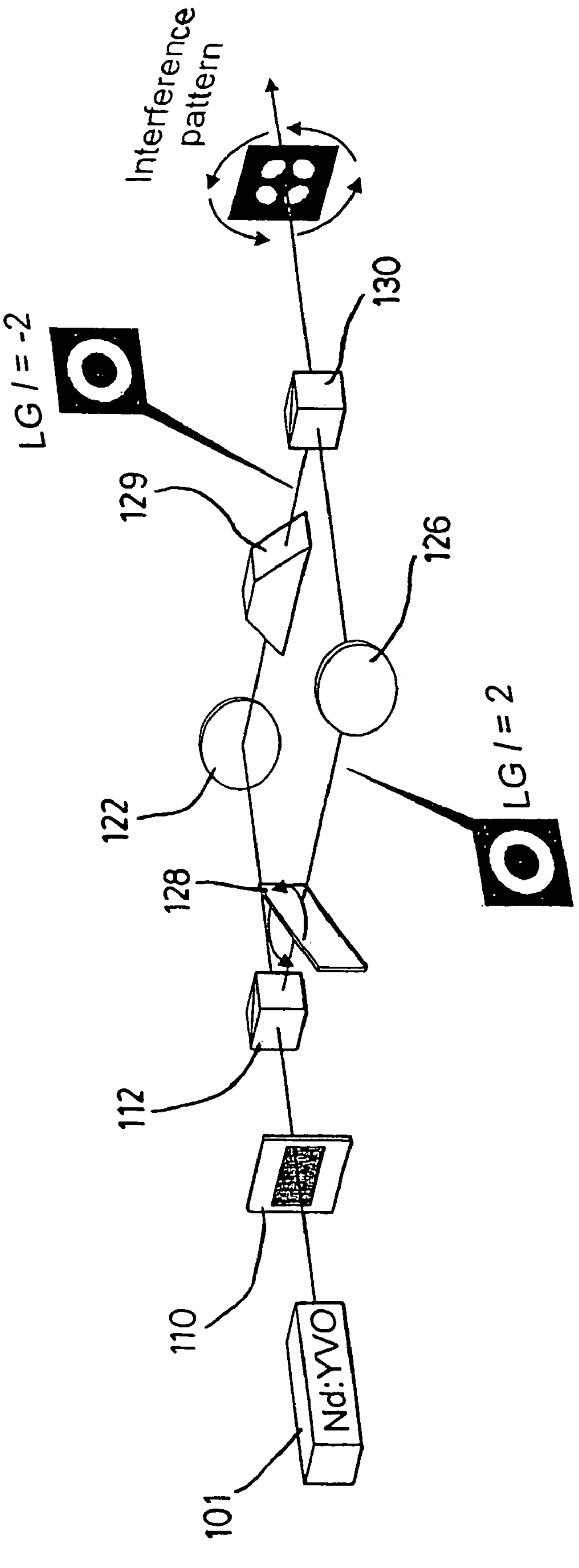
FIG. 5 is a schematic diagram of optical tweezer apparatus in accordance with a further embodiment of the invention.
Figure 6:
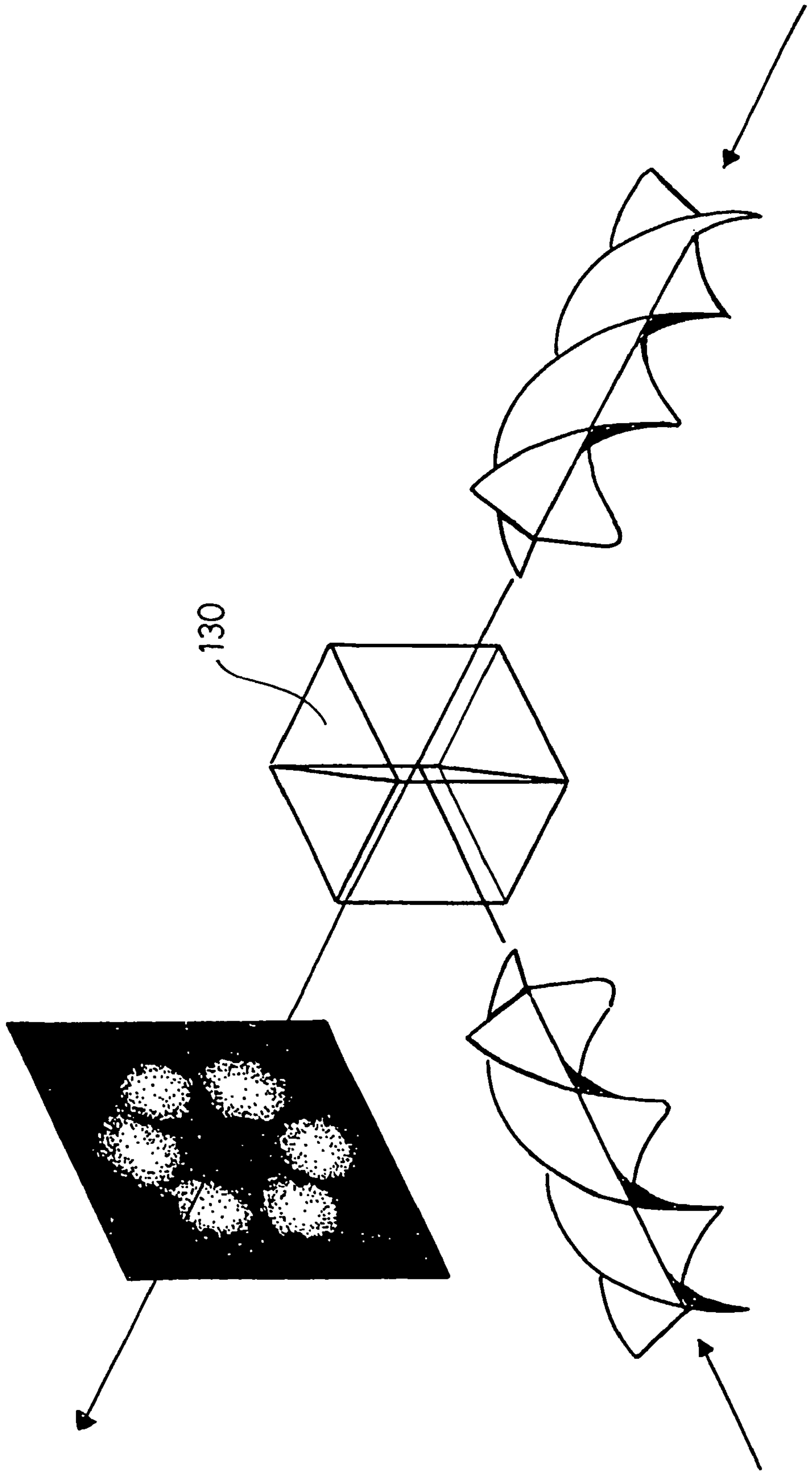
FIG. 6 illustrates the combination of two Laguerre-Gaussian beams.

FIG. 5 illustrates an alternative and preferred interferometer 102. This comprises hologram element 110, and beam splitter 112, thereby providing two Laguerre-Gaussian components from light supplied by laser 101. The two beams are then reflected by mirrors 122 and 126. A pivotable glass plate 128 is provided as before to alter the effective path length of one component. Dove prism 129 inverts one of the beams, and so when recombined by beam splitter 130, an interference pattern is produced which comprises a plurality of spots. This recombination is shown in FIG. 6 which illustrates beam splitter 130, and the resulting interference pattern upon combination of two incoming Laguerre-Gaussian beams with opposite helicities. As before the helicity relates to the azimuthal index 1. When the two such beams have equal magnitude of azimuthal index, the resulting pattern comprises 2 1 spots distributed around an axis. As before the introduction of a path length change in one of the arms of the interferometer allows the pattern to be revolved, with a path length change of (2/λ) leading to full revolution.

In an alternative embodiment, the two Laguerre-Gaussian beams have differing azimuthal indices and again have opposite helicity. This yields a pattern with an odd number of spots, for example FIG. 7*a* illustrates the pattern of spots provided when beams of azimuthal index 1 and −1 are combined, FIGS. 7*b*, 7*d* and 7*f* illustrate the pattern of spots provided when beams of other equal and opposite azimuthal indices are combined and FIGS. 7*c* and 7*e* illustrate the corresponding situation around the focal region due to the interference of two Laguerre-Gaussian beams with different azimuthal indices and opposite helicity.

Figure 7:
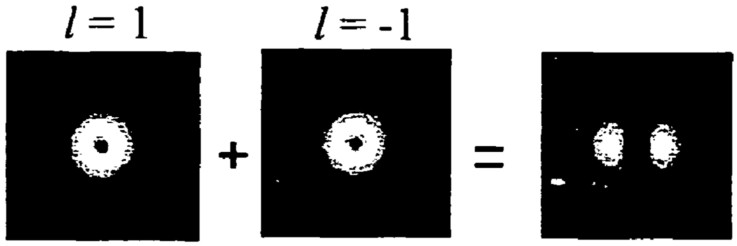
FIG. 7 illustrates interference patterns produced by the apparatus of FIG. 5.
Figure 7:
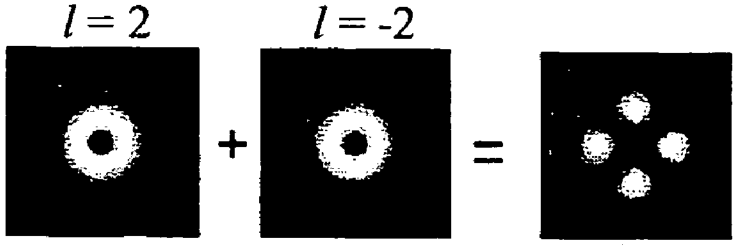
Figure 7:
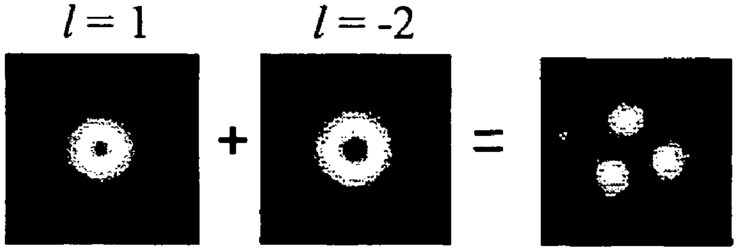
Figure 7:
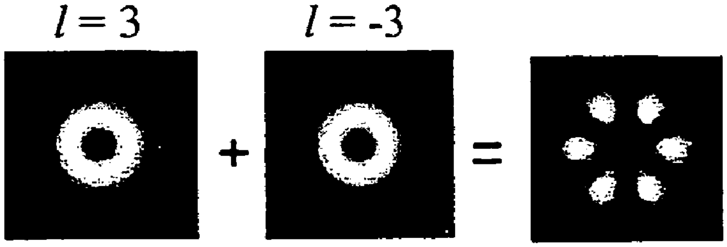
Figure 7:
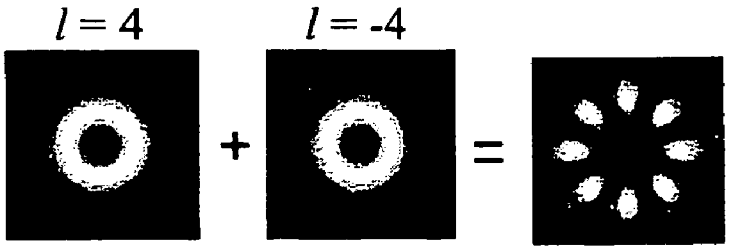
Figure 7:
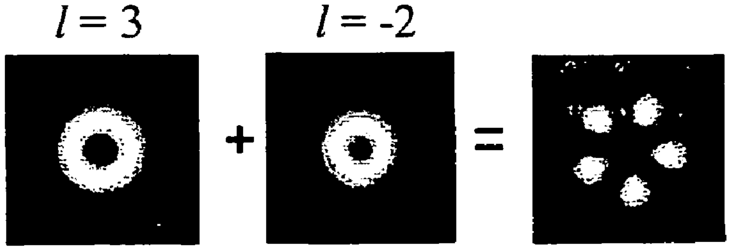
Figure 7:
Figure 7:

An important advantage of using two Laguerre-Gaussian beams is that the resulting spots provide enhanced trapping of particles when compared to the spiral embodiment produced by FIG. 1. This is because the spot pattern is better defined, producing sharper gradients. A primary advantage is that as the resulting spots do not change appreciably either side of the focus position, the particles can be trapped in three dimensions. FIG. 7(*g*) illustrates the pattern of spots at z=0 (the focal point) and $z=z_R$ (the Rayleigh range for l=1 and l=−1 components, where the spots can be seen to have the same shape and that the only change is gradual broadening away from the focal point.

The invention further provides an alternative method for achieving continuous rotation of the trapped particle or particles. The use of the glass plate as discussed above suffers from the eventual limitation that there is a maximum angle through which the particle may be rotated, determined by the range of movement of the glass plate and its thickness. The rotation is caused by a temporal change in the path length between the two beam components, and it is envisaged that this could instead be achieved by using a frequency shifting device between each of the two beams giving the interference pattern. Preferably, at least one acousto-optic modulator disposed in one beam of the interferometer carries out a frequency shift. Typically, two acousto-optic modulators of slightly mismatched frequency shifts in opposite senses will be used. This is because shifts of tens or hundreds of Hertz are typically required but acousto-optic modulators are currently only available for larger shifts. Therefore, a shift of say 100 Hertz is best achieved with a first device shifting the frequency by say 80,000,000 Hz and a second device shifting it in the opposite sense by 79,999,900 Hz. The frequency difference between the two components of the beam gives the resulting rotation rate of the pattern. Therefore, the pattern will rotate continuously without having eventual limits.

An alternative method of arranging a frequency shift is to use the so-called angular doppler shift. Here a rotating plate, such as a half-wave plate, is placed in one component of the beam, transferring angular momentum to circulary polarised light which passes therethrough, altering its frequency.

Figure 8:
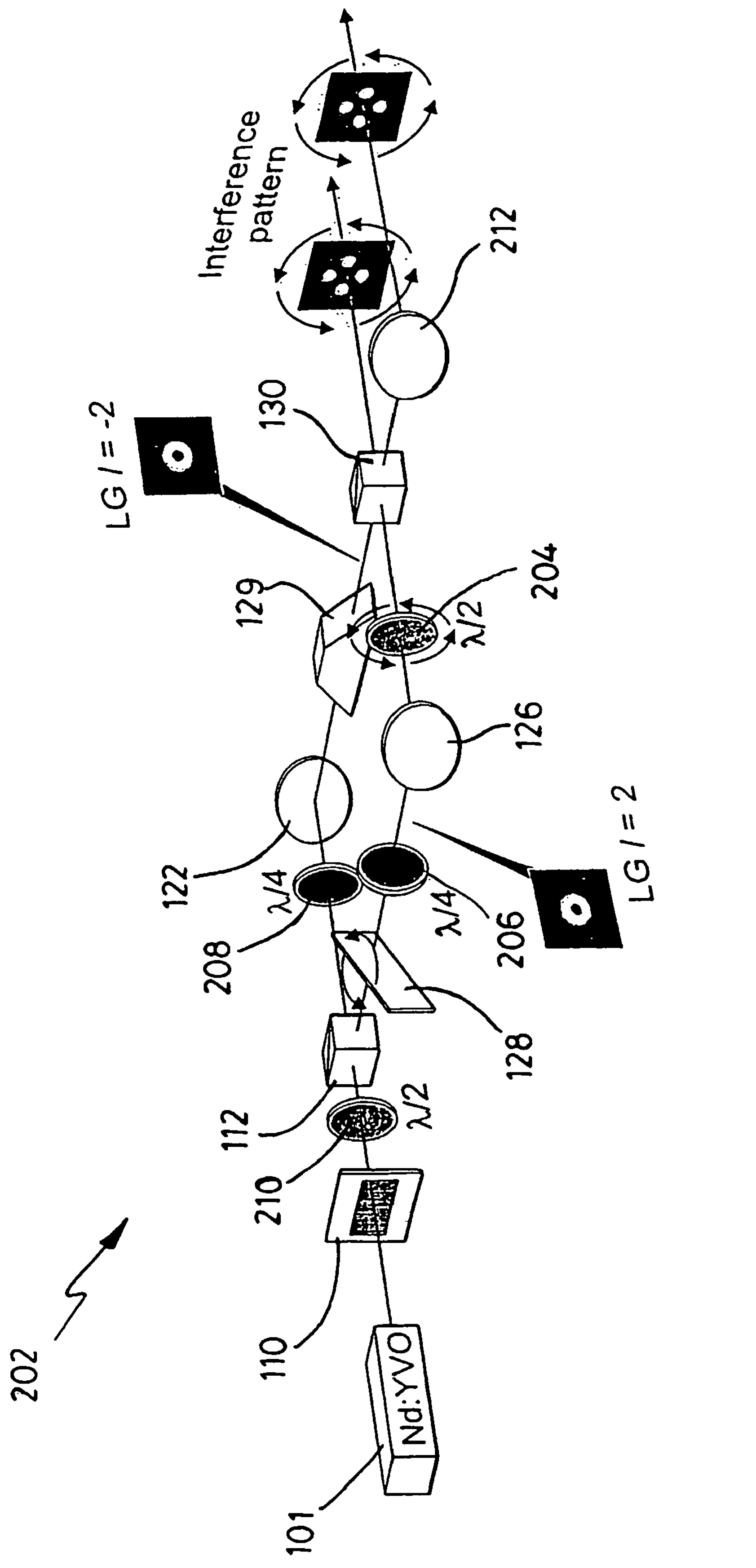
FIG. 8 is a schematic diagram of optical tweezer apparatus using the angular Doppler shift to alter the frequency of a component beam.

FIG. 8 is an illustrative embodiment, corresponding to that of FIG. 5 with the addition of a rotating half-wave plate 204 giving the desired frequency shift by means of the angular doppler effect. In order for the angular doppler effect to work, circularly polarised light is produced by quarter wavelength plate 206. A second quarter wavelength plate 208 in the other component beam path ensures both components have corresponding polarities. Half wavelength plate 210 is adjustable to align the polarisation of the incident laser beam to give two equal outputs from beam splitter 112, output mirror 212 reflects a second output beam from beam splitter 130 to give a second optical tweezer.

Illustrative examples of rotations by the apparatus of FIG. 1 using LG modes l=2 and l=3, will now be described.

The beam from the laser 1 was directed through the holographic element 10 that yielded an LG beam 14 in its first order with an efficiency of 30%. This LG beam is then interfered with the zeroth order beam 12 from the hologram to generate the spiral interference pattern. This pattern is directed through either a ×40 microscope objective 56 in a standard optical tweezer geometry (applicants have also used a 100× objective in place of the objective 56). Typically around 1 mW–13 mW of laser light was incident on the trapped structure in the optical tweezers, with losses due to optical components and the holographic element. The second microscope objective 8 and CCD camera 6 were used for observation purposes.

It is important to ensure exact overlap of the components 12 and 14 at the beam splitter 24 to ensure spiral arms are observed in the interference pattern—at larger angles linear fringe patterns (with some asymmetry) can result. To set trapped structures into rotation the relative path length between the two components 12 and 14 is altered. This was achieved by placing a glass plate 28 on a rotation stage in one arm (i.e. the path of component 14). Simply by rotating this, the applicants were able to rotate the pattern in the tweezers. This control can be realised in other ways such as the use of a thermally controlled etalon or electro-optic devices (instead of the plate 28) further simplifying the experimental arrangement. It is noted that changing the path length in one arm by l×λ will cause a full rotation of 360 degrees of the pattern (and thus the trapped particle array) in the optical tweezers. Thus, in contrast to other rotation methods, the invention provides a very simple way of controlling both the sense and rate of rotation of our optically trapped structure.

Figure 4:
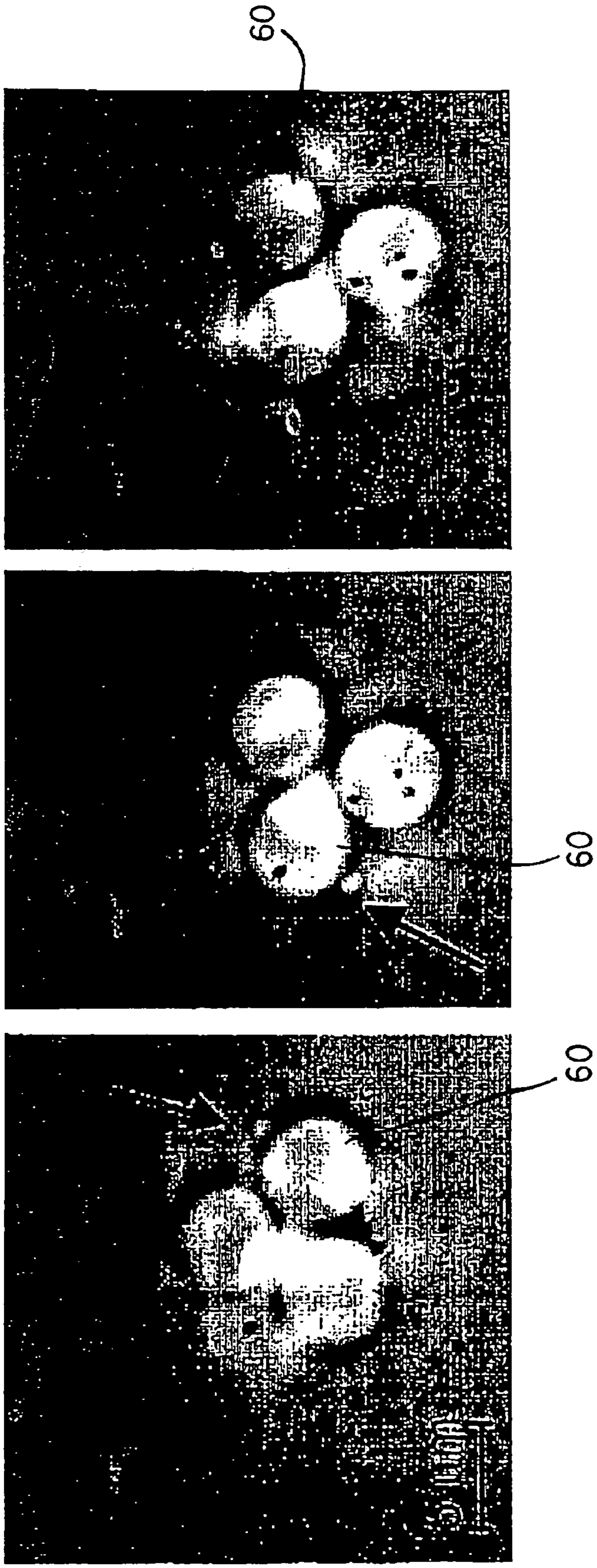
FIG. 4 is a copy of three images obtained from the apparatus of FIG. 1, showing three 5 micron silica spheres which have been trapped in the light pattern produced by the optical tweezers and rotated.
Figure 9:
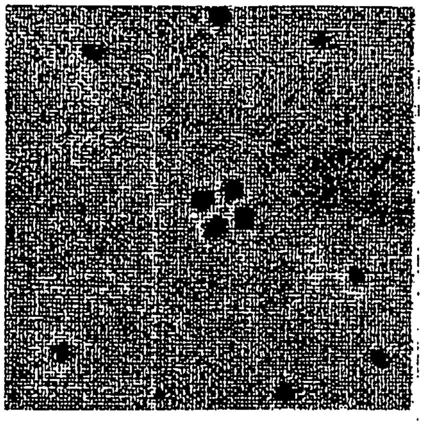
FIG. 9 is a series of images of 1 micron diameter spheres being held in a crystalline structure until the laser is switched off.
Figure 9:
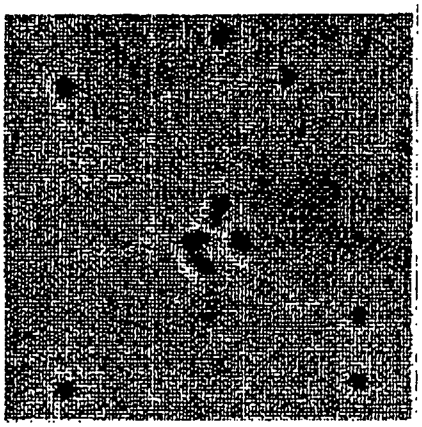
Figure 9:
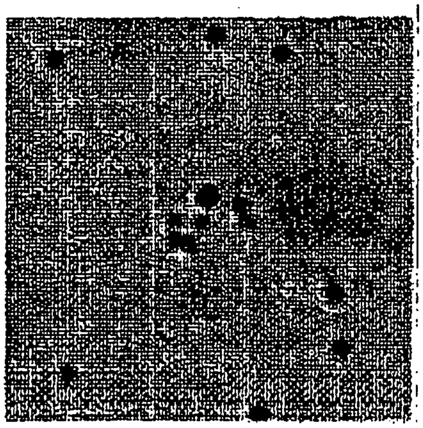
Figure 9:
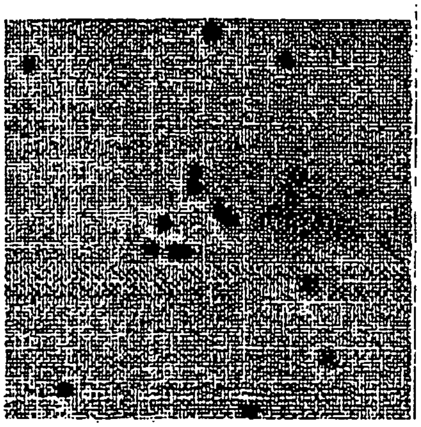

The rotation of trapped particles in an interference pattern between a LG (l=3) mode and a plane wave can be seen in FIG. 4. The number of spiral arms in the pattern is equivalent to the azimuthal index of the LG mode used. In FIG. 4 we see three trapped 5 micron silica spheres in this pattern. One of the spheres (60) has a slight deformity and the series of pictures charts the progress of this structure of spheres as the pattern is rotated. Typically rotation rates of 5 Hz were achieved. The rotation rates were solely limited by the amount of optical power (−13 mW) in the interference pattern. The use of optimised components could lead to rotation rates of tens to hundreds of hertz. The use of a 100× objective (as objective 56) here meant that full three-dimensional trapping of a structure of 1 micron spheres was also achieved. FIG. 9 is an image of eight 1 micron diameter spheres being held in a 2×2×2 cubic array using a combination of beams with l=+2 and l=−2 (FIG. 9(*a*)) and then drifting apart when the laser is switched off.

Figure 10:
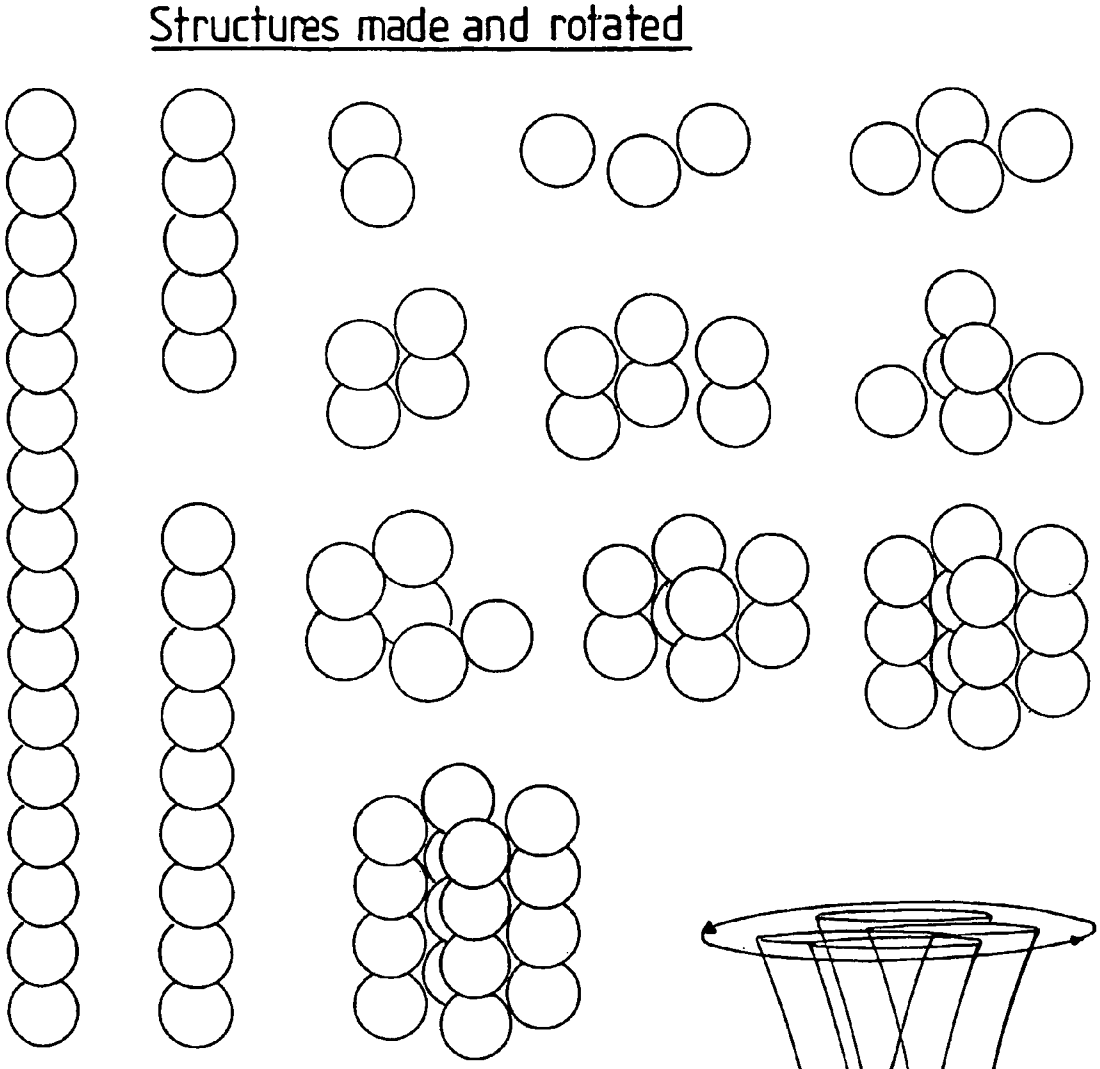
FIG. 10 illustrates various structures which have been made and rotated by this method.
Figure 10:
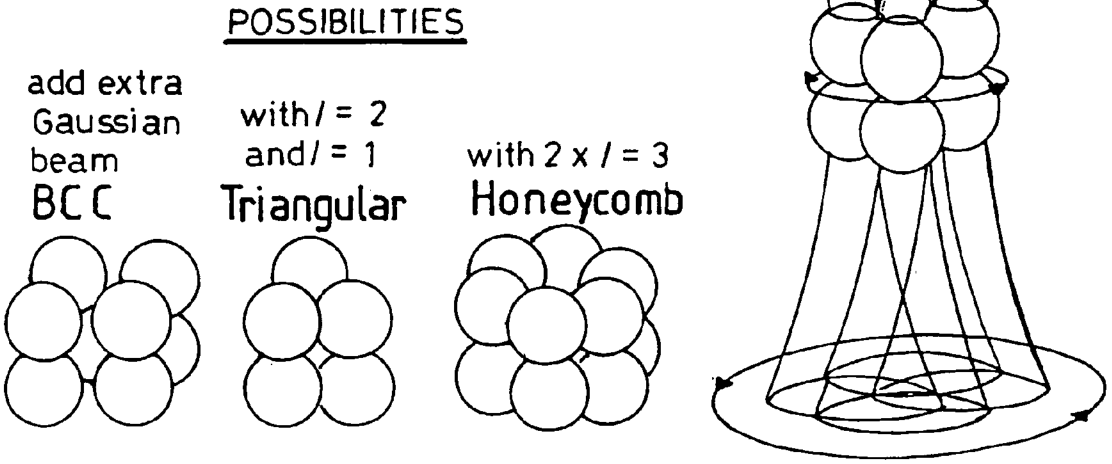

FIG. 10 illustrates further structures which have also been trapped and rotated. FIG. 10 shows that one, two or more layers of particles can be readily achieved. Custom configurations can be made experimentally by moving the beam or sample to pick up individual particles in specific spots. Sufficiently rapid translation can be used to dislodge one or more particles. The BCC structure shown in FIG. 10(*a*) can be made by adding an additional, standard Gaussian beam to hold the central particle.

Figure 11A:
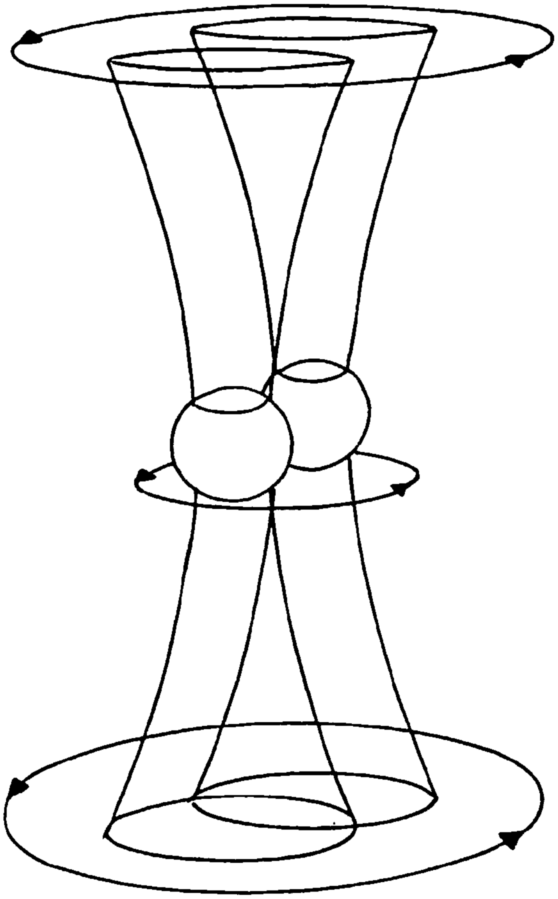
FIG. 11 illustrates the trapping and rotation of particles in 3D.
Figure 11B:
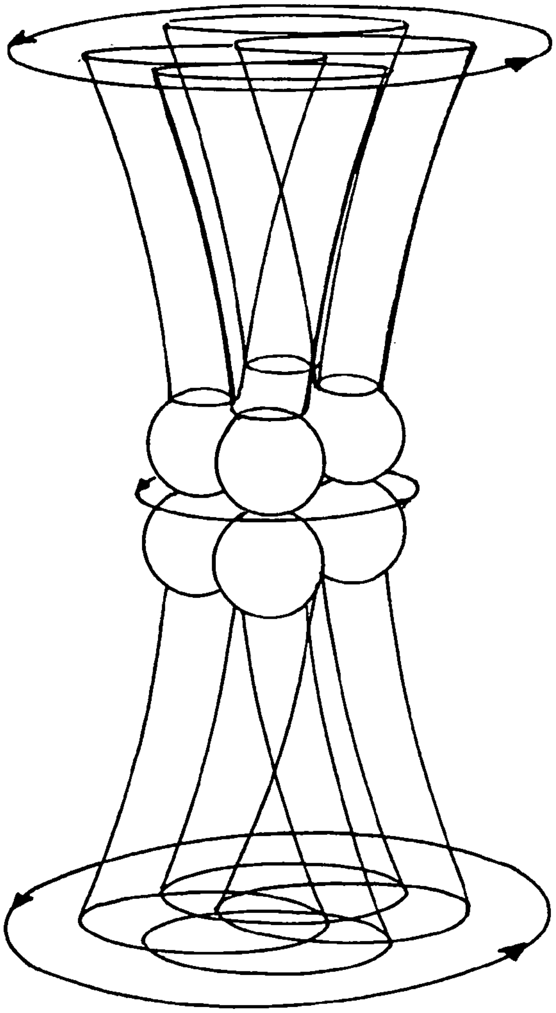
Figure 12:
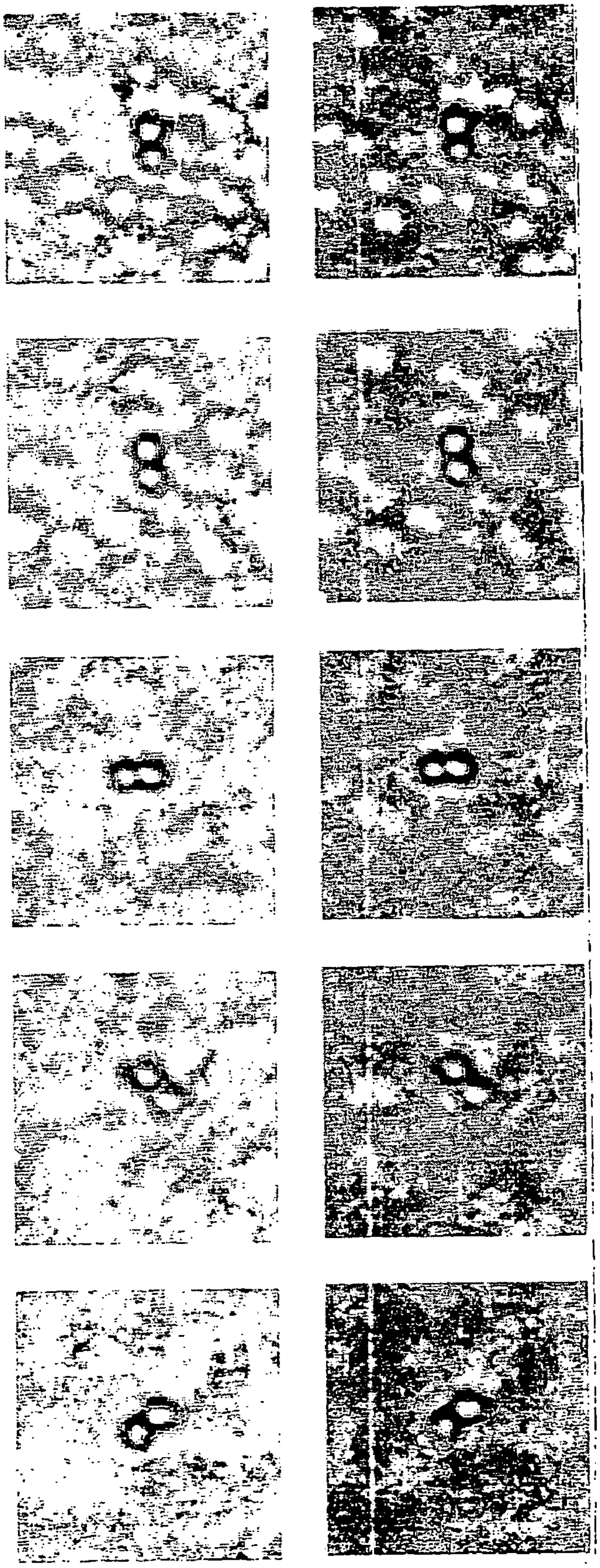
FIG. 12 shows successive photographs of particles rotated and moved in 3D.

FIG. 11 illustrates light intensities used in rotating particles with (a) l=1, l=−1 and (b) l=2, l=−2. FIG. 12 illustrates two particles rotated in the configuration of FIG. 11(*a*) and moved in the z-direction as can be seen by the background moving into focus. This shows that true 3D trapping and movement have been achieved.

One can envisage more complicated microfabricated objects being rotated in the same fashion. Furthermore, silica spheres coated with streptavidin can bind to DNA and thus one could potentially rotationally orient DNA strands or other biological biotinylated specimens with this method.

The member 10 may be interchanged with other holographic members arranged to produce different LG modes for component 14.

The use of an LG l=2 mode, for example, results in two spiral arms for the interference pattern 36. This pattern has been used to rotate a glass rod in the cell. This version of the apparatus therefore constitutes an all-optical micro-stirrer and has potential application for optical micromachines and motors. As a final example a chinese hamster chromosome was rotated in the applicants' tweezer assembly 3 using this same interference pattern with the axis of the pattern placed over the centromere of the chromosome. This degree of flexibility could be used for suitably orienting the chromosome prior to optically cutting sections for example from one of the sister chromatids.

The use of an LG l=2 mode in the LG—LG interferometer creates four spots. Small, 1 micron sizes spheres can be stacked in each of the spots thus creating 3D structures that are crystalline. This can readily be extended using other LG modes to more complex three-dimensional structures and lattices.

In conclusion, the applicants have demonstrated a technique to controllably rotate optically trapped micro-objects. The technique used by the apparatus is widely applicable as it solely relies on the ability to tweeze a micro-object and not on any further intrinsic particle property. Experiments have shown the controlled rotation of trapped structures of silica spheres, glass rods and also a chinese hamster chromosome. The crystal-like 3D structures discussed have also been trapped and rotated in the light patterns as discussed above. The degree of rotation is fully controllable, does not cause any heating to the trapped sample and should find widespread applications with optical and biological micromachines.

The invention claimed is:

1. Apparatus for rotation microscopic objects, the apparatus comprising beam projection means for projecting a microscopic, non-circularly symmetric distribution of electro-magnetic radiation onto a region containing such an object so as to cause photons in the beam to refract around the object, rotating means for rotating the distribution relative to an object in such a region, wherein, in use and said rotation causes optical gradient forces to be exerted on the object, in such a way as to rotate the object.

2. Apparatus according to claim 1, in which the rotation means and beam projection means are incorporated into an interferometer.

3. Apparatus according to claim 2, in which the interferometer has beam splitting means for causing an input beam of laser electro-magnetic radiation to be split into two components traveling along different paths, the interferometer further comprising combining means for re-combining the two components to create an interference pattern which constitutes that distribution of electro-magnetic radiation, the rotation means comprising path varying means for varying the effective path length of one of the components from the splitting means to the combining means.

4. Apparatus according to claim 3 wherein the path varying means comprises a frequency shifting means for altering the frequency of one of said components.

5. Apparatus according to claim 3, in which the interferometer includes adjustment means for altering the relative phase between the two components, causing the interference pattern to rotate about the axis of the recombined beam.

6. Apparatus according to claim 3, in which the beam splitting means is adapted to cause one of the components to be substantially a planar wave and the other component to have helical wave fronts.

7. Apparatus according to claim 6 in which the path varying means is operable to vary the effective path length of the component having helical wave fronts.

8. Apparatus according to claim 6, in which the component having helical wave fronts is a Laguerre-Gaussian beam.

9. Apparatus according to claim 6, in which the beam splitting means comprises a holographic element.

10. Apparatus according to claim 6 wherein the path varying means comprises adjustable transmission means for altering the wave length of the component having helical wave fronts over at least part of its path to the combining means.

11. Apparatus according to claim 10 in which the path varying means is operable to change the wave lengths, and hence the effective path lengths of the component having helical wave fronts without substantially altering the distance travelled by the latter from the beam splitting means to the combining means.

12. Apparatus according to claim 10, in which the transmission means comprises a transparent member and means for moving the member relative to the path of the component of the beam having helical wave fronts to alter the distance travelled by the latter through the transparent member.

13. Apparatus according to claim 3, in which the beam splitting means is adapted to cause both components to have helical wave fronts, with the components having opposite helicity.

14. Apparatus according to claim 5, in which the beam splitting means is adapted to cause the two beams to have different azimuthal indices.

15. Apparatus according to claim 13, in which each of the components, having helical wave fronts, is a Laguerre-Gaussian beam.

16. Apparatus according to claim 13, in which the path varying means is operable to vary the effective path length of at least one of the components having helical wave fronts.

17. Apparatus according to claim 13, wherein path varying means comprises adjustable transmission means for altering the wave length of at least one of the components having helical wave fronts over at least part of its path to the combining means.

18. Apparatus according to claim 17, in which the transmission means comprises a transparent member and means for moving the member relative to the path of one of the components of the beam to alter the distance travelled by the latter through the transparent member.

19. Apparatus according to claim 2 in which the interferometer includes a source of laser light.

20. Apparatus according to claim 1 in which the distribution of electromagnetic radiation comprises a non-circularly symmetric path or a plurality of patches each of which is, individually, circularly symmetric but which defines a non-circularly symmetric distribution.

21. A method for rotating a microscopic object about a rotational axis spaced from any axis of a circular symmetry of the object, the method comprising steps of projecting a patch of light onto the object, said patch being non-circularly symmetric about said rotational axis, and rotating the patch about the rotational axis, thereby to exert on the object an optical gradient force for rotating the latter.

* * * * *